Mar. 20, 1923.
R. B. McGOWAN.
GROUND VASE.
FILED JUNE 14, 1922.
1,448,808.
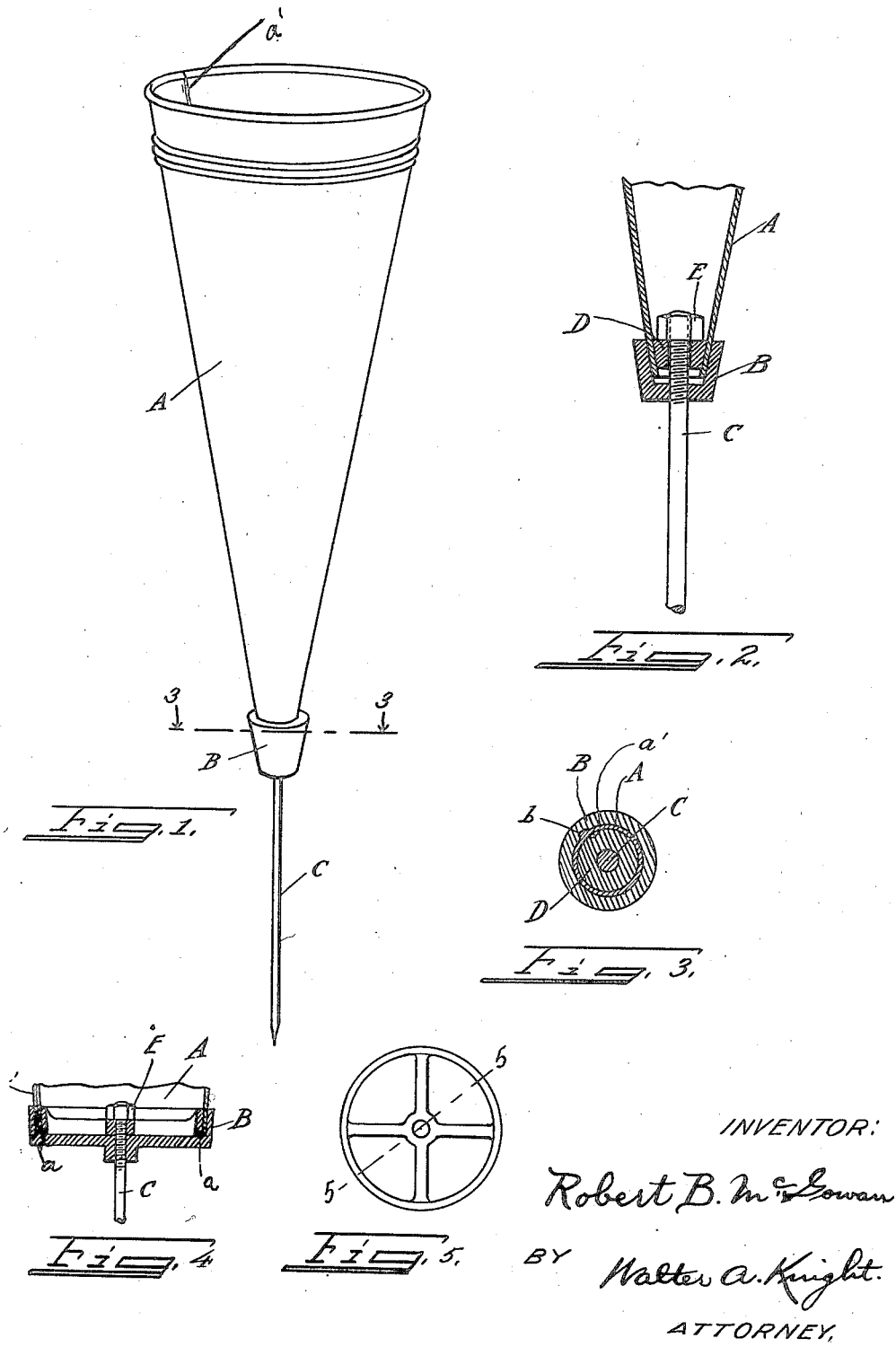
INVENTOR:
Robert B. McGowan
BY Walter A. Knight.
ATTORNEY.

Patented Mar. 20, 1923.

1,448,808

UNITED STATES PATENT OFFICE.

ROBERT B. McGOWAN, OF CINCINNATI, OHIO.

GROUND VASE.

Application filed June 14, 1922. Serial No. 568,320.

*To all whom it may concern:*

Be it known that I, ROBERT B. McGOWAN, a citizen of the United States, residing at Cincinnati, in the county of Hamilton and State of Ohio, have invented new and useful Improvements in Ground Vases, of which the following is a specification.

My invention relates to ground vases and is particularly adapted to be used out-of-doors and in cemeteries. The object of my invention is to provide a cheap, convenient, durable, water-tight, metal, flower vase that can be stuck into the ground when and where needed for use. It may be painted so as to be entirely inconspicuous, or decorated in any manner to suit the taste of users; the paint serving to preserve the metal from oxidation and to make all joints leak tight.

In the particular embodiment of my invention selected for illustration:

Figure 1 is the preferred form of the vase shown in elevation,

Figure 2 a detail, is an enlarged vertical axial section of the socket, the bottom part of the vase proper and its means of attachment to the pin, with the pin and nut shown in full, Figure 3, a detail, is an enlarged horizontal cross-section on the line 3—3 of Fig. 1, Figure 4, is similar to Fig. 2, but shows the vase in an alternative form of construction, and Figure 5, a detail, is a plan view of the inner conical plug.

Referring now to the drawings, Figures 1, 2 and 3, A represents a conical metal vase element; B a conical socket or cup in which the vase element seats; C is a pin or picket threaded at one end; D a conical plug and E a draw nut adapted to hold the parts together.

The vase element A open at the apex is adapted to seat in the conical socket B. The socket B is pierced through its center and threaded so as to engage the threaded end of the pin C. The threaded end of the pin C is produced into the vase beyond the threaded portion of the conical socket B. The conical plug D is pierced through its center and adapted to seat loosely over the produced threaded end of the pin C, and wedge the vase element to the socket. The nut E engages the threaded end of the pin C and by tightening it down, it forces the conical-shaped plug D towards the apex of the vase and thereby firmly wedges the vase element into the socket and holds the parts together, and makes a leak-tight joint. The socket B may be made having a vertical groove $b$ on the inside of its wall adapted to engage a vertical rib or seam $a^1$ formed on the outside of the vase element A, when it is made of sheet metal.

It will be apparent that if the earth is soft or sandy the vase may be pushed down into the ground as far as desired.

In the alternative form shown in Fig. 4, the vase element is made more nearly cylindrical in shape, and an inwardly turned flange $a$ is formed at the bottom. The socket member B is made with an extended flat bottom portion upon which the flange $a$ may seat; and the bottom of the plug D presses the flange tightly against this flat bottom of the socket, when the nut E is tightened down, making a leak-tight joint. As so constructed, the vase will hold more water and the flower stems may extend to the bottom of the element A.

Many changes may be made in this device without departing from the spirit of my invention; and all forms that are readable upon the claims or any of them which shall be finally allowed hereon, are within the scope of the invention.

I claim as my invention and desire to secure by Letters Patent of the United States:

1. A ground vase having in combination a pin threaded at its upper end and with its lower end adapted to be pressed into the ground, an upwardly turned socket upon said pin towards its upper end, a conical member forming the sides of the vase adapted to have its lower end seated in said socket, a clamping collar on the upper end of said pin within the conical sides, and a draw nut upon the upper end of said pin adapted to clamp the conical member between said collar and socket.

2. In combination with the conical sides of a metal vase, a conical socket in which said conical sides seat, a conical plug adapted to seat within said conical sides, a metal pin adapted to be produced beyond the apex of said conical vase and means for securely binding all said elements together.

3. In combination with a ground vase, a pin threaded at its upper end and with its lower end adapted to be pressed into the ground, and an upwardly turned socket secured thereto.

In testimony whereof I have hereunto set my hand.

ROBERT B. McGOWAN.